Nov. 10, 1959 R. E. MAURER 2,912,327
PRESCREENED NEGATIVE PHOTOGRAPHIC MATERIAL
Filed April 9, 1954 2 Sheets-Sheet 1
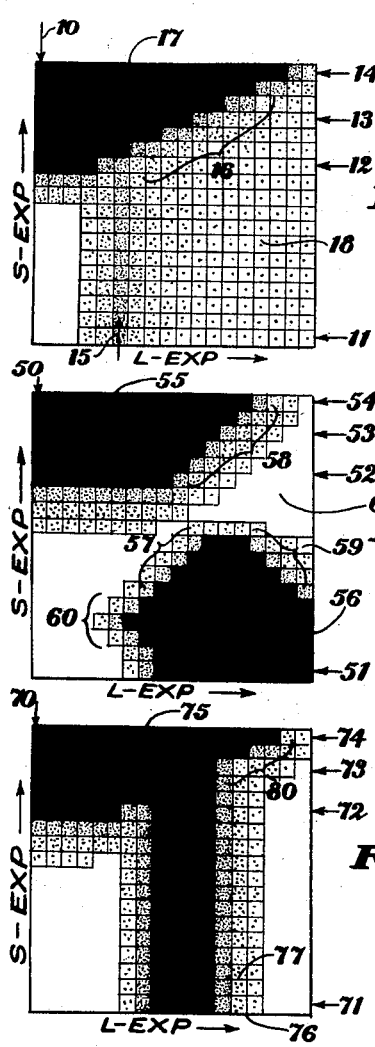
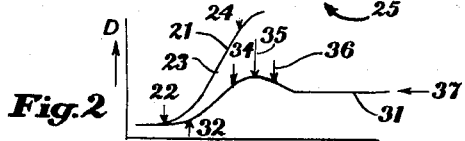
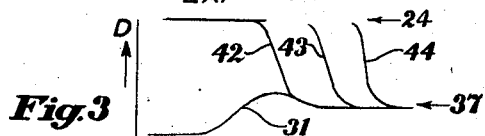
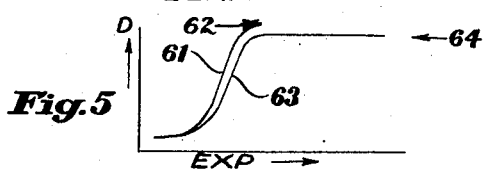
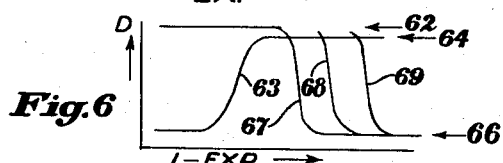
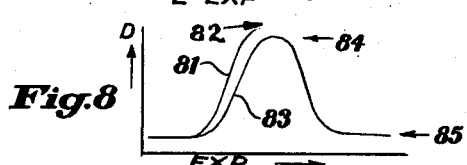
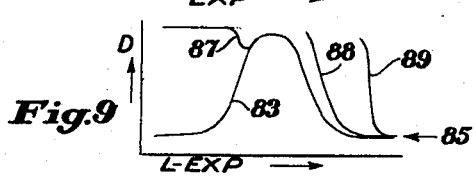
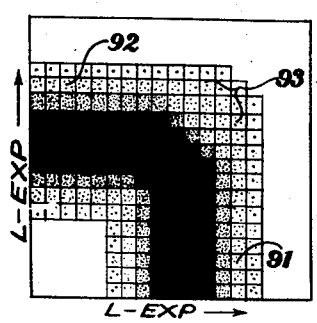
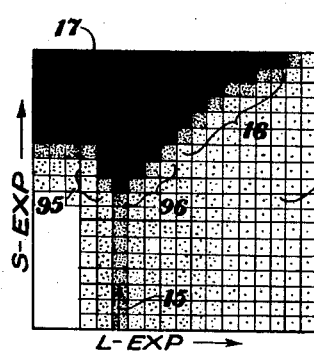
Richard E. Maurer
INVENTOR.
ATTORNEYS Nov. 10, 1959     R. E. MAURER     2,912,327
PRESCREENED NEGATIVE PHOTOGRAPHIC MATERIAL
Filed April 9, 1954     2 Sheets-Sheet 2
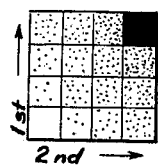
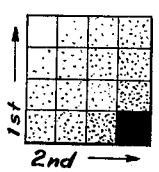
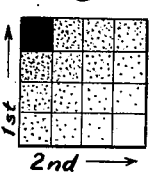
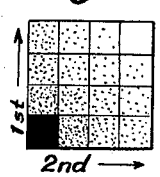
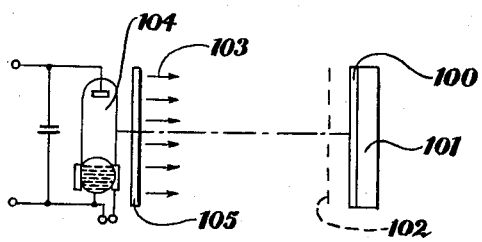
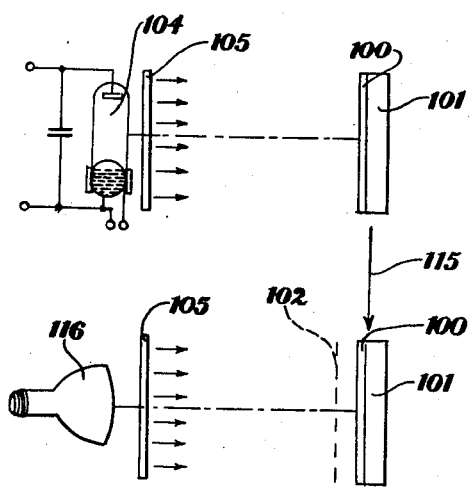
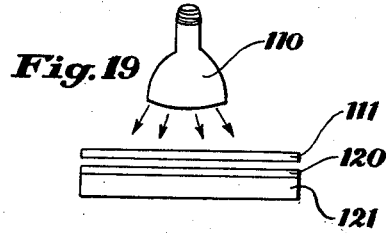
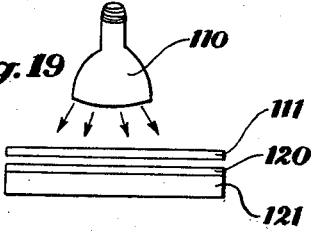
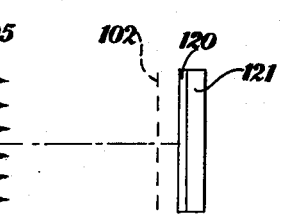
Richard E. Maurer
INVENTOR.
ATTORNEYS ; # United States Patent Office 2,912,327
Patented Nov. 10, 1959

2,912,327
PRESCREENED NEGATIVE PHOTOGRAPHIC MATERIAL

Richard E. Maurer, Rochester, N.Y., assignor to Eastman Kodak Company, Rochester, N.Y., a corporation of New Jersey Application April 9, 1954, Serial No. 422,054

4 Claims. (Cl. 96—79)

This invention relates to photographic material which has been prescreened to give a halftone record upon exposure to a continuous tone image.

It employs the L.I.D. effect described by R. E. Maurer and J. A. C. Yule in a paper entitled "A Photographic Low Intensity Desensitization Effect," in vol. 42, No. 6, June 1952, issue of the "Journal of the Optical Society of America," pages 402–408.

Certain preferred embodiments of the invention are direct positive materials which produce a halftone positive directly upon ordinary development after exposure to a continuous tone positive image. These preferred embodiments require the image exposure to be an ordinary long exposure as distinguished from a short duration exposure such as produced by a flash lamp.

A different embodiment of the invention has the advantage of permitting the image exposure to be made by flash lamp, such as by a vapor flash lamp of the type now commonly used in photographic studios. This embodiment gives a negative halftone from a positive continuous tone image.

Cross-references are made to my two applications Serial Nos. 422,052 and 422,053, filed concurrently herewith. There are three particularly useful forms or embodiments of L.I.D. prescreened materials and the three forms are respectively the subject matter of the three cases.

Each form or embodiment includes three species of which the second and third may be considered special kinds of the first.

All species of all embodiments require the emulsion to be L.I.D. sensitive. L.I.D. means either "low intensity desensitization" or "latent image destruction," but it is the same effect whichever way it appears. The L.I.D. effect is one of the effects which may occur when a silver halide emulsion is given two successive exposures. As will be pointed out at length below, it is quite different from the Herschel effect, the Clayden effect, the Villard effect, etc., but these well-known effects also involve two successive exposures of emulsions. The L.I.D. effect occurs when the addition of a long exposure (either before or after) reduces the density produced by a short exposure. The long exposure desensitizes if first or destroys if second. It occurs only for relatively large exposures (measured in terms of intensity × time). The short exposure must be above the threshold for such exposures, whereas the Clayden effect, for example, employs short exposures much below threshold. The long exposure for the L.I.D. effect must be above the shoulder exposure value for such long exposures and it is usually well up in the solarization range of such long exposures.

The L.I.D. effect does not occur with all emulsions and does not occur with all developers. Certain emulsions will fail to show the L.I.D. effect in one developer, but will show it quite strongly in another. On the other hand, another emulsion will show the L.I.D. effect in both of these developers. For example, ordinary cine-positive duplicating film shows little or no L.I.D. effect in D–19 developer but shows it quite strongly in lith type developers. Certain emulsions show it quite strong in X-ray developer but not at all in lith type developers, whereas many double coated X-ray films commonly available on the market do not show it in X-ray developer but do show it extremely strongly in lith type developers.

The gelatino-silver bromoiodide emulsion made up as follows showed the L.I.D. effect quite strongly.

One hundred seventy grams of silver nitrate were dissolved in 1027 cc. of a 4.3% ammonium hydroxide solution at 55° C. A separate solution was prepared by dissolving 137 grams of potassium bromide and 3.5 grams of potassium iodide together with 160 grams of photographic gelatin in 1500 cc. of distilled water at 55° C. with stirring. The silver nitrate solution was then added to the halide gelatin solution in a period of 21 seconds with good mixing. After this addition, a solution consisting of 44 cc. of concentrated sulfuric acid, diluted with 88 cc. of distilled water, was added to the mixture. Thereafter, 106 grams of photographic gelatin previously soaked in 500 cc. of distilled water were added to the emulsion and the mixture was stirred for 5 minutes at 55° C. and then cooled. The emulsion was allowed to gel in a refrigerator and then noodled and washed by osmosis in cold running water.

After washing, the emulsion was remelted and adjusted to 40° C. 52.5 grams more of photographic gelatin were added, and the mixture was stirred at 40° C. until this gelatin was dissolved completely, after which the total weight of the emulsion was adjusted to 4.56 kg. by the addition of distilled water. At this point, if desired, the conventional antifoggants, hardeners, and sensitizing dyes, such as one of the merocyanine dyes described in the Brooker et al. U.S. Patent No. 2,493,748, may be added. The resultant mixture was coated at the rate of 0.005 mol of silver halide per square foot on a clear safety film support. When tested, this coating showed a very strong L.I.D. effect.

The term "L.I.D. sensitive emulsion" by definition must carry with it the understanding that the emulsion is developed in suitable developer. This is not at all unusual since the common statement that an emulsion is "sensitive" infers that it is going to be developed in a suitable developer. Just as sensitive emulsions are "sensitive" only when liquids which fail to bring out the sensitivity are avoided, so L.I.D. sensitive emulsions are "L.I.D. sensitive" only with respect to a certain group of liquids. Not all types of L.I.D. sensitive emulsions are used but only those having the properties pertinent to the three species described below.

The first species of each embodiment involves an emulsion which gives greater maximum density (well-known as D max) to short exposures than to long exposures. The second species involves an emulsion which is not only L.I.D. sensitive but is also Clayden sensitive. Not all emulsions which are L.I.D. sensitive are Clayden sensitive and not all emulsions which are Clayden sensitive are L.I.D. sensitive, but some do have both sensitivities. In this species of the various embodiments of the invention the Clayden effect reduces the sensitivity to long exposures and hence in the region of the L.I.D. effect, the Clayden effect reduces the D max caused by long exposures. In the third species of each embodiment solarization is employed to reduce the density effect of the long exposure.

Definitions

A brief or short duration exposure, herein called the S exposure is any exposure of less than .01 second duration. These exposures are high intensity, but the brevity is the important distinguishing feature as far as the present discussion is concerned. Brief exposures are easily obtained by flash lamps or vapor flash lamps and the intensity depends on the distance of the lamp from the emulsion and on other factors such as lenses and filters. The well-known Clayden effect is produced by an S exposure whose intensity-times-time is less than threshold. The L.I.D. effect is concerned only with S exposures greater than threshold.

A long duration exposure, herein called the L exposure, (normally of much lower intensity than the S exposure) is an exposure of more than 1 second duration. In both cases the duration limits are selected from the sake of definiteness. The best effects employ S exposures much briefer than .01 second and L exposures much greater than 1 second, sometimes several minutes, but the limits selected pretty well represent the values at which useful effects are just obtained for emulsions which show such effects. The L exposure is associated with a characteristic curve, whose shape depends on the emulsion and developer used. The threshold value of the L exposure is not of great significance with respect to L.I.D. phenomena, but the "shoulder exposure" and "solarization exposure" are.

The shoulder of the characteristic curve is well-known as the point or region above the straight line or gamma part of the curve and below D max, at which point the contrast or slope starts to fall off. The exposures necessary to produce this point on the curve is called the "shoulder exposure." "Solarization exposure" is a still higher value, at which D max is passed and reversal starts. In some emulsion-developer combinations discussed herein, the D max for L exposures is very low and does not fall off very much as the solarization point is passed. This means that the solarization exposure may be hard to detect, but it happens that in these cases (where D max for L exposures is low and D max for S exposures is high) the shoulder exposure is a more important value than the solarization exposure.

The L.I.D. effect is present whenever the addition of a long exposure (either before or after the S exposure) reduces the density produced by a short exposure. The long exposure necessary to do this to any appreciable degree is greater than the "shoulder exposure" value. The L.I.D. effect starts at about this value.

The term "dot" is herein used to refer to the halftone pattern element, i.e, the whole element, as is common practice.

The "center" of the dot or element is the center of the black squares of the checkerboard pattern; which appears for middle tones; the "corner" of the dot or element is the center of the white squares of the checkerboard pattern.

In positive highlights a tiny black spot appears at the center; in the shadows a tiny clear round spot appears at the corner. Although these spots are also commonly called dots, the term dot herein has the precise meaning of whole element, usually square and diagonal to the middletone checkerboard. Thus a highlight dot is both the tiny spot and the clear field around it and a shadow dot is the large black area with clear corners. The pattern consists solely of juxtaposed dots, each one part dark and part while or clear, or each one made up of a distribution of exposures of sensitivities as hereinafter described.

Some emulsion developer systems or combinations do not show the L.I.D. effect and some which do show it, also tend to mask the effect (at least for values near the "shoulder exposure" value) by the density produced by the L exposure itself. That is, in some cases, the L exposure does two things. It reduces the density produced by the S exposure and at the same time it produces a density itself which almost counteracts the reduction.

However, there are three types of emulsion-developer combinations for which this conflict is avoided and which thus exhibit to the full any L.I.D. effect which is present. Any L.I.D. sensitive emulsion-developer system which produces a low D max for L exposures and a high D max for S exposure, exhibits its L.I.D. effect whichever exposure is first and for all values of L exposure above "shoulder exposure" value; in this first system it does not matter whether the emulsion is Clayden sensitive or not or whether it polarizes or not.

The second useful type of L.I.D. sensitive emulsion-developer system employs a Clayden sensitive emulsion and at least part of the S exposure is given first. Even at values much less than threshold, the S exposure produces a Clayden effect which prevents the subsequent L exposure producing appreciable density. At the higher values of S exposure a latent density is produced by the S exposure and this latent density is destroyed by the subsequent L exposure greater than "shoulder exposure." Whatever D max for L exposure is possible is of no consequence since it is effectively eliminated by the Clayden effect.

This second type may be considered a species of the first type in which the preparation of the emulsion includes an S exposure less than threshold which makes D max for L exposures less than D max for S exposures. After this Clayden desensitizing exposure has been given, it may not matter which order the remaining exposures are in; the rest of the S exposure may precede or follow the L exposure. Since this second type of emulsion-developer system utilizes all of the Clayden effect available, any reduction of this Clayden effect, for example, by having the second S exposure separate from the first one, acts in the detrimental direction but is not too serious.

The third useful type of L.I.D. sensitive emulsion-developer system involves a high degree of solarization so that after "solarization exposure" has been given, density due to L exposure is on the decline at the same time as this L exposure is destroying any latent S exposure image or is desensitizing the emulsion to any subsequent S exposure. Thus even if D max for L exposures is high and no Clayden effect is available, it is still possible to use the L.I.D. effect with L exposures above "solarization exposure." This system is the least preferable of the three since the effective sensitivity to S expsure (in the L.I.D. range) is greatly reduced. At threshold S exposure and even for values a considerable degree above threshold, the L exposure masks the L.I.D. effect and useful contrast in the L.I.D. effect is not reached until the S exposure is very high. Also it requires abnormally high L exposure (above solarization value).

Although it is not as direct as for the second type, this third type may also be considered a species of the first type in which the preparation of the emulsion includes all solarization by L exposure. The solarization could all be prior to the S exposure and the remaining L.I.D. part of the L exposure. The latter two exposures may then be in either order. However, this third species also includes the case where the S exposure is first and the full L exposure including both the part for solarization and the additional part for L.I.D. are afterward.

Thus all useful species of the L.I.D. effect have S exposures greater than threshold, L exposures greater than shoulder, maximum density due to S exposures greater than the density due to such L exposures (greater by at least .5 which is here slecated as the lower limit of useful amounts of L.I.D. effect) and a reduction of the S exposure density by the L exposures. An L.I.D. sensitive emulsion is hereby defined as one which under the above circumstances gives such a reduction of density with a value of at least .5 for at least one pair of S and L exposures. These density values are selected merely to distinguish over less desirable degrees of the L.I.D. effect.

All of these definitions raise the academic question of what happens for medium duration exposures. Actually the effects are relative and some medium exposures act like long exposures with respect to S exposures or like short exposures with respect to L exposures. The small effects obtained are of little practical value and consideration thereof is avoided by limiting S exposures to those less than .01 second and L exposures to those longer than 1 second which, of course, also limits the ratio of exposures to some value greater than 100:1 all of which distinguish over values which give insignificant degrees of L.I.D. effect.

The various embodiments of the invention and the precise meaning of the terminology used will be fully understood from the following description when read in connection with the accompanying drawings in which:

Figs. 1 to 11 inclusive illustrate crossed step tablet sensitometer test films for various species of the invention and the characteristic curves corresponding to these sensitometer test films.

Figs. 12, 13, 14 and 15 respectively represent the characteristic feature of crossed step tablet sensitometer test films for cumulative exposures, desensitization, image destruction, and solarization.

Figs. 16, 17 and 18 schematically illustrate the methods of producing three forms of L.I.D. prescreened film.

Fig. 19 illustrates the making of a direct positive halftone image using prescreened film made by the methods illustrated in Figs. 16 and 17.

Fig. 20 similarly illustrates the making of a halftone negative using prescreened film prepared by the method illustrated in Fig. 18.

The crossed step tablet technique is a procedure used in sensitometry to gain a great deal of information at one time about the effect of two successive exposures on a sensitive emulsion. In one form of the crossed step tablet technique the first exposure is given through a step tablet in which the steps have successively decreasing density so that the exposures behind the steps are of successively increasing intensity. The step tablet is then rotated through 90° with respect to the film or plate carrying the emulsion and the second exposure is made through the tablet. Thus for each intensity of the first exposure, there is a complete range of second exposure intensities and for each intensity of the second exposure there is a complete range of the first exposure intensities. Only one step tablet is used for both exposures, but because of the change in orientation, the procedure is referred to as a crossed step tablet test. An equivalent constant-intensity-variable-time system can be set up using an ordinary variable time sensitometer and rotating the film through 90° between successive exposures. The following description is concerned with constant-time-variable-intensity exposures and hence a variable density step tablet is actually used in this crossed step tablet test.

Fig. 1 shows a sensitometer test film in which either the short exposure or the long exposure is given first. Intensity of exposure for the short exposure increases toward the top and intensity of exposure for the long exposure increases toward the right. During the short exposure the most dense step of the tablet is at the bottom and the least dense step is at the top. During the long exposure the most dense step is at the left and the least dense step is at the right. Column 10 receives a negligible amount of L exposure and hence represents the effect of S exposure alone. The H and D curve for column 10 is shown as 21 in Fig. 2 starting with a threshold 22 and rising in density through a straight line portion 23 to a high value 24 and eventually to a D max represented by the level 25. The exposure corresponding to the point 22 is termed the threshold exposure for short exposures and the exposure corresponding to the point 24 is at least twice threshold exposure.

The present invention is not concerned with densities above the value at 24 and this may be a shoulder value but with most emulsions particularly the lith type, the density usually continues to rise to much higher values.

Hence it is better to refrain from using the term "shoulder" when discussing the S exposures. The term "shoulder" is proper with respect to the L exposures however. Coining a term for the exposure corresponding to the point 24, one may call it the "effective shoulder exposure" or "maximum used exposure" or simply "HS exposure" inferring high S exposure.

In Fig. 2 the exposure scale for the short and long exposures need not necessarily be the same and the threshold and other corresponding values of these exposures are usually not the same. The row 11 in Fig. 1 receives substantially no S exposure and hence represents the effect of L exposure alone. This is shown as curve 31 in Fig. 2. The density rises from a threshold value 32 to a shoulder value 34 and up to a D max 35 which is much lower than the D max 25 for S exposures. In fact, the D max 35 is so low in the samples illustrated in Figs. 5 and 7 of the optical society paper mentioned above that it is not detectable in the printed reproduction. It is, however, plotted in the curves accompanying the illustrations. The density then solarizes slightly and point 36 corresponds to solarization value of the exposure since it is at the point 36 that a substantial amount of reversal sets in. In the examples shown, the solarization is not very great and the density becomes uniform at level 37.

The area 17 of Fig. 1 having a density greater than 24 is quite black compared to the area 18 which has only the very low density 37. Column 15 has slightly higher density than the rest of the area 18 and corresponds to D max 35 for long exposures.

The region labeled 16 in Fig. 1 represents the L.I.D. effect. When the short exposure is given first, it produces the latent image density represented by column 10, but the long exposure destroys this latent image as indicated in the region 16 in proportion to the amount of long exposure given. When the long exposure is given first, it desensitizes the emulsion to subsequent short exposures and thus results in the region 16 as before. In Fig. 3 the curve 31 corresponding to row 11 is again reproduced but in addition thereto curves 42, 43 and 44 are plotted corresponding to rows 12, 13 and 14 respectively.

The manner in which this phenomenon is applied to prescreening will be discussed below but it may be noted at the moment that if the film is prescreened by S exposure, it will have a latent image dot which in the absence of any L exposure would develop up completely black (i.e. high density above "HS" value all over) but which is reduced in size in proportion to the amount of L exposure given. Thus we have a direct positive halftone process. On the other hand, if prescreening is done by L exposure to a film which has received no S exposure, the prescreening is in terms of degree of desensitization and the size of the black dots increases with increasing S exposure subsequently applied, which is a negative halftone process.

Not all emulsions have a D max for S exposure greater than the D max for L exposure and if they are the same, or nearly the same, the density of the areas 17 and 18 of Fig. 1 are substantially the same so that the L.I.D. effect is pretty well masked; that is, the drop from density 24 or 25 to density 37 of Fig. 3 would be substantially negligible if the density 37 were almost as high as the density 24. However, there are some common emulsions in which this apparent difficulty can be easily overcome. One such emulsion is illustrated in Figs. 4–6 in which the emulsion has Clayden sensitivity as well as L.I.D. sensitivity.

The H and D curve 61 of Fig. 5 corresponds to column 50 of Fig. 4 and rises to a high density 62. The H and D curve 63 corresponds to the row 51 of Fig. 4 and rises to a maximum density 64 not appreciably less or a useful amount less than density 62. The areas 55 and 56 are both quite black and if they merged, the L.I.D. effect illustrated by the area 58 would be completely masked and the material would not be useful for the present invention. However, this particular material is Clayden sensitive and S exposures less than threshold desensitize the material to subsequent L exposures as indicated in the region 57; that is, the region 57 represents ordinary Clayden desensitization. The region 59 represents solarization cumulatively due to the two exposures, but it does not matter whether there is solarization present of not providing the Clayden effect reduces the density sufficiently for all L exposures. Thus the Clayden effect provides the light area between the areas 56 and 55. The L.I.D. effect in area 58 is thus even more pronounced than in Fig. 1 because the residual density in area 18 in Fig. 1 is greater than the density in area 65 of Fig. 4.

The density versus exposure curves for rows 52, 53 and 54 are illustrated in Fig. 6 as 67, 68 and 69 respectively. For these curves the density drops from a very high value 62 to a very low value 66 and hence such materials are particularly useful in halftone work.

For the sake of completeness, Fig. 4 illustrates a form of Clayden effect which is a little unusual but which is observed in some cases. The region 60 indicates that very low values of S exposure first increases the sensitivity of the film to L exposure and at slightly higher values start to decrease it again by the Clayden effect. A precise definition of Clayden effect which says that the short exposure reduces the sensitivity from its original value should include the case where the original value includes that of the slightly hypersensitized emulsion since in some cases the Clayden effect only removes this hypersensitization and thus only brings the sensitivity back to that of the completely unexposed film. Such special films are Clayden desensitizable and can be used in the Clayden prescreening invention described in patent application Serial No. 291,623, filed June 4, 1952, by Yule and Maurer. The present invention uses either form of Clayden desensitization and in fact the present invention operates in a region above that in which complete Clayden desensitization has already been applied.

The Clayden desensitization is due to the S exposure below threshold. This Clayden desensitization can be separately applied to the film first. The film is then effectively in the same condition as the film illustrated in Fig. 1 since it has a high D max for short exposures and a low D max for long exposures. In fact, after the Clayden desensitization has been applied, the S exposure and L exposure may be in either order; that is, a certain amount of S exposure is first given as a part of the preparation of the emulsion and then the remainder of the S exposure and the L exposure are given in either order. Successive short exposures sometimes reduce the amount of Clayden effect, in which case the first mentioned embodiment in which the S exposure is all given at one time is preferable. Of course, it is often convenient to give the Clayden part of the S exposure and the image forming part of the S exposure at the same time since the image forming part of the S exposure includes the Clayden desensitizing part provided the S exposure is given before the L exposure.

Fig. 7 illustrates a third species of the invention which again has such a high D max for long exposures that it is not a useful amount less than the highest S exposure densities which are used. Curve 81 rising to a high density 82 in Fig. 8 represents column 70 of Fig. 7 and curve 83 rising to a D max 84 represents row 71 of Fig. 7. Since density 82 is not appreciably greater than density 84, areas 75 and 76 of Fig. 7 merge and substantially obliterate the L.I.D. effect which is present. However, due to solarization in the region 77 of Fig. 7, the density curve 83 falls off to a low density 85. If one now plots the density represented by rows 72, 73 and 74, one gets curves 87, 88 and 89 respectively. It will be noted that the L.I.D. effect in the region 80 shows up because of the solarization of the L exposure by itself. If solarization is considered as part of the preparation of the emulsion, it is noted that the threshold for S exposure has risen almost up to the row 73 which means that the film is considerably slower and it is also noted that the L exposures are not effective to reduce the density due to the S exposure until the L exposures exceed the solarization value. However, the L.I.D. effect is present and is quite apparent in such emulsions providing sufficient exposures are given. Preparation of such emulsions for L.I.D. requires the solarization to be applied before the L.I.D. effect shows up but it may be applied either before or after the S exposure is given. In this respect it is not exactly like the Clayden effect since the Clayden effect must be fully applied as part of the preparation of the emulsion before either exposure is given.

Fig. 10 is included to show the effect when both exposures are L exposures. Solarization occurs in regions 91 and 92 and cumulative solarization occurs in region 93.

Fig. 11 is included to correspond to one of the illustrations in the optical society article referred to above. In connection with Fig. 1, it was stated that either the L exposure or the S exposure could be first and this is quite true for many such emulsions. However, there are a few emulsions which produce the sensitometer sheet shown in Fig. 1 when the L exposure is first but which produces an effect like that shown in Fig. 11 when the S exposure is first. The areas 17 and 18 still have a large difference in density and the region 16 represents ordinary L.I.D. effect. However, in the region 95 the two exposures appear to be first additive or to have some cumulative effect but this is very quickly overcome by an extension of the L.I.D. effect as indicated in region 96. In fact, this added effect, when it does occur, merely improves the whole system as far as prescreening is concerned since in the region 96 the material has been hypersensitized to S exposures and the whole range of the L.I.D. effect has been extended; that is, the sensitivity of the material has been increased and at the same time the scale has been extended.

Figs. 12 to 15 are included to simplify the interpretation of any two crossed step tablet tests. If any two successive exposures are merely cumulative both giving increased density, the effect is that shown in Fig. 12 in which the lower left hand corner has the least density and the upper right hand corner has the most density.

If the first exposure desensitizes the film to the second exposure, the result is shown in Fig. 13 in which the upper left hand corner has the least density and the lower right hand corner has the most density. Clayden desensitization is exactly this type of thing in which the S exposure is given first and the L exposure is given second. Thus area 57 of Fig. 4 corresponds to Fig. 13. The L.I.D. effect is also this when the L exposure is given before the S exposure. If Fig. 1 were turned over so that L exposure increases upward and S exposure increases to the right instead of the way it is shown, then region 16 of Fig. 1 would correspond to Fig. 13. In practice the sensitometer strip shown in Fig. 1 is easily turned over and viewed from the back. It should be noted that in Figs. 12 to 15 the first exposure is always increasing toward the top and the second exposure is always increasing toward the right whereas Fig. 1 shows the S exposure and the L exposure effects whichever is first.

If the first exposure causes a latent density and then this latent density is destroyed by the second exposure, the result is that shown in Fig. 14 in which the lower right hand corner is the least dense and the upper left hand corner is the most dense. If the S exposure is given first in Fig. 1 and the L exposure is given second, the region 16 as shown in Fig. 1 corresponds exactly to Fig. 14. Thus the long exposure destroys the latent image produced by the short exposure.

Finally if two successive exposures are cumulative to reduce the density of the latent image, such as in the case of solarization, the result is that shown in Fig. 15 in which the least dense area is in the upper right and the most dense area is in the lower left corner of the film. It is noted that desensitization by pre-exposure and latent image destruction by subsequent exposures are not necessarily the same thing. When the S exposure is given first and the L exposure is given second as in Fig. 4, desensitization appears in region 57 corresponding to Fig. 13 and latent image destruction appears in region 58 corresponding to Fig. 14. However, when the L exposure is given first and the S exposure is given second, the desensitization due to the L exposure turns out to be due to the same effect as the latent image destruction of the above case and appears in the same region of the crossed step tablet test provided the S exposure is always plotted as ordinate and the L exposure is always plotted as abscissa whichever one is first. This is one of the peculiar characteristics of the L.I.D. effect; it is independent of the order in which the exposures are given.

In Fig. 16 an L.I.D. sensitive emulsion layer 100 carried on a support 101 is exposed through a halftone screen 102 shown as a ruled screen out of contact with the emulsion layer 100. However, the exposure could just as easily be through a contact screen of vignetted dots held in contact with the emulsion 100. The exposure as indicated by arrows 103 is provided by a vapor flash lamp 104 through a plate 105 which is a light diffusing screen when a contact halftone screen is used and is the usual aperture plate when a ruled halftone screen is used. Distances are the ones ordinarily used in halftone work but are exaggerated for clarity in the drawings. The vapor lamp 104 is a standard high intensity flash lamp giving an exposure on the order of .0003 second duration. The lamp is held near enough to the film 100 so that the density of exposure even in the areas of the emulsion 100 which receive the least exposure because they are behind the black lines of the screen 102, is sufficient to raise the density just to a useful level; that is, the emulsion 100 is fully fogged and if developed without further exposures, it would appear substantially black. The areas of the emulsion 100 behind the rulings of the screen 102 are referred to as the corners of the dots of the halftone pattern of the latent image created in the emulsion 100 by this exposure. Thus the exposure of even the corners of the dots is above threshold exposure. The exposure in the centers of the dots; i.e., in those areas behind the opening in the screen 102, is at least twice and usually ten times the exposure at the corners. The greater the difference between the exposures at the centers and corners, the greater the range or scale of the prescreened material except when the ordinate is reached in which some effect such as solarization by the S exposure starts to cut down on the range. However, this is not normally reached in practice and no such effect is illustrated in Figs. 1 to 11.

This prescreened material 100 produces a halftone positive directly as shown in Fig. 19 when exposed by a tungsten lamp 110 such as an R-2 photoflood lamp for a period of time exceeding one second, through a positive transparency 111. The most dense portions of the transparency 111 transmit only enough light to destroy the weak (but high density) image in the corners of the dots. The middle tones of the transparency 111 transmit more light which destroys the image at the corners of the dots and for some distance toward the centers of the dots. The most transparent areas of the positive 111 will permit full exposure of the prescreened film destroying all of the latent image so that no dot is formed. Thus we have a positive halftone directly upon exposure through a continuous tone positive transparency 111, followed by development of the film 110 in the developer for which it is L.I.D. sensitive and for which the threshold and shoulder exposures are those specified.

Fig. 17 is a flow chart illustrating two steps of a second method of prescreening L.I.D. sensitive film. In this embodiment a film 100 on a support 101 is first given a uniform flash by a vapor lamp 104 through a plate 105. This exposure is substantially the same as that given in Fig. 16 so that all of the area of the emulsion 100 receives full exposure corresponding to the centers of the dots. The next step of this second embodiment represented by arrow 115 involves placing the fogged emulsion 100 behind a halftone screen 102 which again may be either a ruled screen or a contact vignetted screen. The latent image in the film 100 is then partially destroyed in the form of a halftone pattern by exposure from a tungsten lamp 116 through the plate 105. The duration of this exposure is greater than one second and the duration times intensity is such that behind the clear areas of the screen 102, the corners of the dots (not the centers as was the case in Fig. 16) have the latent image destroyed back to approximately threshold value with respect to S exposures. The latent image behind the ruled areas of the screen 102 is not appreciably destroyed and these areas become the centers of the dots. The film is now effectively identical to that obtained by the system shown in Fig. 16 except that the centers of the dots are behind the ruled areas of the screen in Fig. 17 and are behind the apertures in the screen in Fig. 16. The film produced by the method shown in Fig. 17 can be exposed, as shown in Fig. 19, in exactly the same way as the film prepared by the method shown in Fig. 16. Both films are direct positive materials. In general the two methods produce films of different contrast, but for that matter each method can be arranged to produce films of different contrast so that this is not a particularly distinguishing feature.

The third embodiment of the invention is a prescreened film prepared by the method shown in Fig. 18. In this case an L.I.D. sensitive emulsion 120 on a support 121 is exposed through a halftone screen 102 by a long exposure from a lamp 116 and plate 105. This is the first exposure given to the film 120. This L exposure is a desensitizing exposure and does not produce any latent image in the emulsion 120. The effect is similar to Clayden prescreened film in that the resulting film has a halftone pattern of desensitization and when exposed to a positive image gives a negative. However, for many purposes it has two advantages over Clayden prescreened film. The advantage is that the image exposure as illustrated in Fig. 20 may be given by a vapor flash lamp 122, whereas Clayden prescreened film does not give a halftone image when so exposed. In other words, if it is a lith type film, it can be used for making halftones through a contact screen or it can be prescreened and used for making halftones without an additional screen and the speed will be about the same in the two cases.

Still another embodiment of the invention which is fully equivalent to that shown in Fig. 17 merely reverses the order in which the two exposures are given. Thus the first exposure is much like that shown in Fig. 18 and then the fogging S exposure is given which converts the desensitization of Fig. 18 to a halftone latent image the same as that produced by the method shown in Fig. 17. In fact, as far as manufacturer is concerned, the two steps shown in Fig. 17 could be performed by the manufacturer in either order selecting the one which gave the best keeping qualities for the resulting film. If one wishes to have maximum keeping qualities, the film could be prescreened as shown in the second step of Fig. 17 or as shown in Fig. 18 and then the fogging S exposure shown in the first step of Fig. 17 could be given just before the screening exposure; that is, the operator would apply the fogging S exposure just before using the film so as to avoid any question of latent image fading, which in some emulsions is more prevalent than fading of the desensitization. The only disadvantage would be that the operator would have to have a vapor flash lamp or the equivalent to give the fogging exposure before he gives the image exposure shown in Fig. 19.

Very weak L.I.D. sensitivity found in some emulsion developer combinations is, of course, of little practical value for prescreening. Accordingly, the definition of L.I.D. sensitive emulsions are those in which at least a .5 difference in density can be produced by the L.I.D. effect and which have a difference in density between D max for S exposure and D max for L exposure also greater than .5, at least in the L.I.D. region.

Although the primary advantages of the L.I.D. effect in halftone work is with respect to prescreening, it is noted that the L.I.D. effect can also be used in processes in which the screening is applied subsequent to the continuous tone image exposure. The continuous tone image could be applied by an S exposure and then screened by an L exposure which destroys the latent image converting it from a continuous tone to a halftone image. This gives a negative halftone for the L.I.D. effect which further distinguishes from the corresponding Clayden process which gives a direct positive halftone using lower intensity, short and long exposures. Alternatively the film could be fogged by an S exposure and then the image exposure applied as an L exposure destroying the latent image and giving a continuous tone positive directly which is converted to a halftone by an additional long exposure through a halftone screen to a uniform source. Thirdly, the image exposure could be first applied as an L exposure purely desensitizing the film without creating any appreciable image therein (except for the low density produced by L exposures alone) and then a uniform S exposure through a halftone screen would produce a halftone positive of the continuous tone image which, in the absence of the screening, is a low density negative.

I claim:

1. The method of making a prescreened photographic film for image exposures of less than .01 second duration and for development to a screened negative in a developer after such exposure, which method comprises exposing a hereinafter defined film to a hereinafter defined screen exposure, said film having a L.I.D. sensitive silver halide emulsion layer which when developed in said developer produces densities to high E value exposures of less than .01 second duration at least .5 greater than its D max to exposures of more than 1 second duration and said screen exposure being: (a) an L.I.D. desensitizing exposure, (b) more than 1 second duration, (c) uniform onto and through a halftone screen and (d) distributed in a halftone dot pattern with the E value at the centers of the dots about shoulder value for said long exposures and at the corners of the dots at least twice that at the centers, there being no separate exposures of less than .01 second duration through the screen and the latent density due to said long exposure being negligibly small, so that if developed without further exposure, the film would appear substantially uniformly gray with a density approximately equal to said D max to exposures of more than 1 second duration.

2. The method according to claim 1 in which said emulsion layer is also Clayden sensitive and including prior to said exposing, the additional step of uniformly exposing the layer to brief exposure less than .01 second duration and with an E value less than threshold for such brief exposures, to Clayden desensitize the layer and to provide at least part of the difference in densities producible by brief and long exposures.

3. A prescreened photographic film made according to the method of claim 1.

4. A prescreened photographic film made according to the method of claim 2.

References Cited in the file of this patent

UNITED STATES PATENTS

| | | |
|---|---|---|
| 1,995,958 | Bennett | Mar. 26, 1935 |
| 2,005,837 | Arens | June 25, 1935 |
| 2,102,021 | Murray | Dec. 14, 1937 |
| 2,126,516 | Szasz | Aug. 9, 1938 |
| 2,211,345 | Murray | Aug. 13, 1940 |
| 2,691,580 | Howe | Oct. 12, 1954 |
| 2,708,626 | Yule et al. | May 17, 1955 |

OTHER REFERENCES

Clerc: Photography Theory and Practice, 2nd ed., pages 141–142, Greenwood & Co. Ltd., London, 1937. (Copy in Scientific Library.)